Henry Lamb's
Improvement in Eye Glasses & Spectacles

71770

Henry J Lamb, Inventor
New York

PATENTED
DEC 3 1867

Witnesses
J. J. Bausch
Geo. Frauenberger

United States Patent Office.

HENRY LOMB, OF NEW YORK, N. Y.

Letters Patent No. 71,770, dated December 3, 1867.

---

IMPROVEMENT IN EYE-GLASSES AND SPECTACLES.

---

*The Schedule referred to in these Letters Patent and making part of the same.*

---

TO ALL WHOM IT MAY CONCERN:

Be it known that I, HENRY LOMB, of the city, county, and State of New York, have invented a new and useful Improvement in Eye-Glasses and Spectacles; and I do hereby declare that the following is a full and exact description thereof, reference being had to the accompanying drawings, and to the letters of reference marked thereon, of which—

The object of my invention is to improve eye-glasses or spectacles, so as to secure a firm, and at the same time easy and comfortable hold on the nose, by so constructing the frame as to make it readily adapt itself to any nose, of whatever shape, and making it easily adjustable to the variable relative position of the eyes.

The construction hitherto in use, of this kind of eye-glasses or spectacles, has been such as to secure the necessary hold on the nose in but an imperfect manner, always subjecting the wearer to an uncomfortable and irritating pinch on the organ in question, owing, in part, to the smallness of the surface on which the whole pressure of the spring is exerted, and partly to the hardness and rigidity of the material in immediate contact; some could not at all, and some only with much labor, be made properly to suit the different widths of eyes.

To enable others skilled in the art to make and use my invention, I will proceed to describe its construction and operation.

Figure 1:
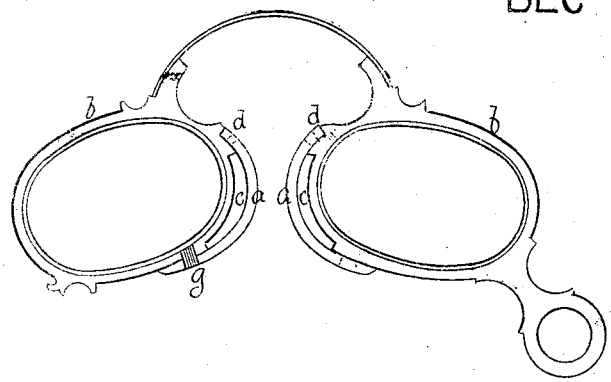
Figure 1 represents an eye-glass with my improvement thereon.
Figure 2:
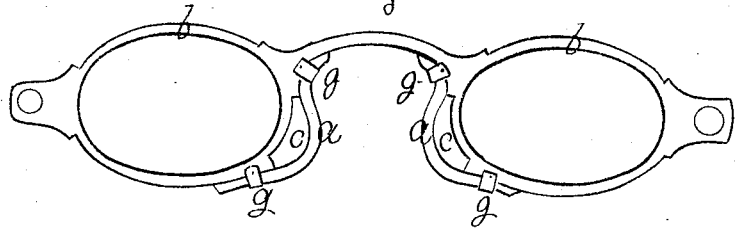
Figure 2 represents a spectacle, showing my improvement, *a a*.
Figure 3:
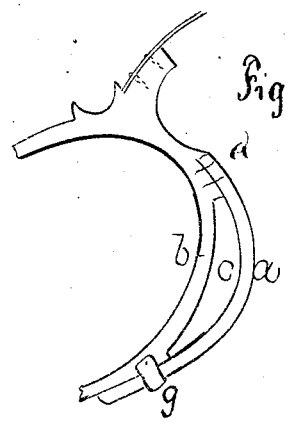
Figure 3 represents an enlarged section of an eye-glass frame, with nose-piece, *a*.

I take two strips (marked *a a* in drawings,) made of soft India rubber, or of material equally yielding and elastic, which strips *a a* I shall call nose-pieces, and affix them, one to each lens-frame, hollow, or in such a manner as to allow sufficient space between the nose-pieces *a a* and lens-frames *b b*, figs. 1, 2, and 3, to enable the pieces *a a* to yield according to their elasticity, so as to conform to the shape of the nose, thus securing a firm hold thereon to the entire extent of the length of the nose-pieces *a a*, and so preventing a concentration of the pressure on any isolated or particular point, which latter is the case with all eye-glasses or spectacles of this kind constructed after the usual plan, which only touch the nose in a tangential manner. The fastening of the elastic nose-pieces *a a* to the lens-frames *b b* may be effected in various well-known ways. I prefer to fasten the upper end of each nose-piece by means of one or more screws, at *d d*, to the lens-frame. The lower end of each elastic strip forming the nose-pieces *a a*, may either be secured to the respective lens-frame in the same manner, by one or more screws, or it may be slipped through a small loop or band, *g*, attached to the lens-frame, so as to admit of the enlargement or decrease of the spaces *c c*, by drawing the elastic strips *a a* (which must be left of sufficient length for such purpose,) either way through such loops, so as to increase or decrease the distance between the nose and the lens-frames, in order to bring the centre of each lens respectively opposite the centre of the corresponding eye, in accordance with the laws of vision.

What I claim as my invention, and desire to secure by Letters Patent, is—

The elastic bands or straps *a*, in combination with an eye-glass or spectacle-frame, when such bands or straps are fastened to the frame only at or near their ends, and between such points are left free of the frame, with an opening or space between, substantially as described for the purpose specified.

HENRY LOMB.

Witnesses:
  GEO. FRAUENBERGER,
  J. J. BAUSCH.